No. 841,268. PATENTED JAN. 15, 1907.
A. PAGNIEZ.
APPARATUS FOR TREATING LIQUIDS WITH GASES.
APPLICATION FILED SEPT. 6, 1905.
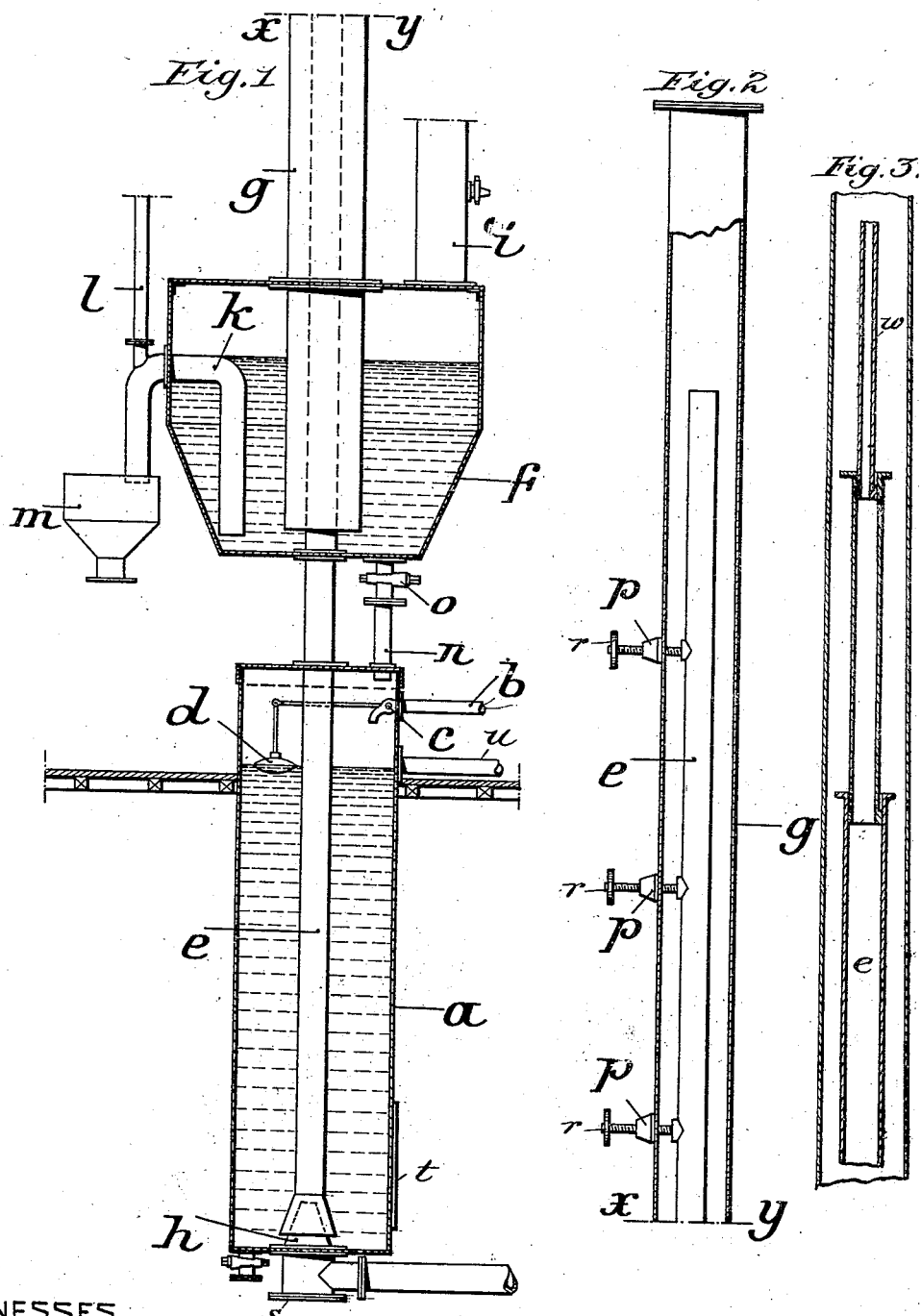

UNITED STATES PATENT OFFICE.

AUGUSTE PAGNIEZ, OF CAUDRY, FRANCE.

APPARATUS FOR TREATING LIQUIDS WITH GASES.

No. 841,268. Specification of Letters Patent. Patented Jan. 15, 1907.

Application filed September 6, 1905. Serial No. 277,239.

*To all whom it may concern:*

Be it known that I, AUGUSTE PAGNIEZ, director, a citizen of the French Republic, residing at Caudry, Department Nord, France, have invented certain new and useful Improvements in Means for Treating Liquids with Gases; and I do hereby declare the following to be a full, clear, and exact description of the invention, such as will enable others skilled in the art to which it appertains to make and use the same.

This invention relates to an apparatus for saturating or impregnating juices of sugar in a continuous manner by carrying the liquid along under the action of gas at a low pressure while being impregnated or saturated therewith.

Figure 1 of the accompanying drawings shows in part sectional elevation the construction of the said apparatus as applied to sugar-juices. Fig. 2 shows the upper part of the apparatus continued from the line $x\,y$ of Fig. 1, and Fig. 3 shows a modification of the part shown in Fig. 2.

This apparatus consists of a vertical tank $a$, containing the juices maintained at constant level, but which may be of variable height for regulating the operation, the juices, previously treated with lime, being supplied to the tank through a pipe $b$ and entering through a cock $c$, which is controlled by a float $d$.

In the central vertical axis of this tank is arranged a pipe $e$, which receives the jet of gas under the required pressure through a suitable orifice $h$.

The bottom of the tank is provided with a discharge-cock $s$, and in the side of its lower part is a manhole closed by a cover $t$ for enabling the interior of the tank to be cleansed.

The vertical pipe $e$, which is open at its upper end, passes through a closed vessel $f$, placed above the tank $a$, and it extends upward beyond the vessel within a casing formed by a concentric tube $g$, closed at its upper end. This surrounding tube $g$ starts from near the bottom of the vessel $f$ and is fixed to the cover thereof in a water-tight manner, so as to leave a small space between its lower edge and the bottom of the vessel $f$ for the purpose of allowing the liquid carried along by the gas and the gas which is not absorbed by the liquid to flow into the vessel $f$, in which the liquid remains, while the excess of gas escapes through a chimney $i$.

At the bottom of vessel $f$ is fixed a pipe $n$, with cock $o$ controlling the discharge of the carbonated liquid back into the tank $a$. The cock $o$ enables the whole or part of the liquid to be conveyed back into the tank that may not have been sufficiently saturated, and thus to regulate the degree of saturation.

Near the bottom of the vessel $f$ is the lower end of a siphon-pipe $k$, the external limb of which opens into a funnel $m$, with exhaust-pipe $l$ serving to receive the carbonated liquid for filling into vessels. The vertical pipe $e$, in which is effected the impregnation or mixture of the sugar-juices treated with lime and the gas, is provided at various points of its height with openings having valves $p$, that can be opened and closed from the outside by screw-spinples with hand-wheels $r$ and which serve to discharge the carbonated liquid at variable heights into the surrounding tube $g$, according to the degree of carbonation which it is desired to obtain. The same result can be attained by the provision of tubes $w$, Fig. 3, sliding telescopically upon the upper part of the pipe $e$ and adjustable as regards its height. The pipe $e$ can be provided with testing devices facing the valves. An overflow-pipe $u$ enables the excess of liquid to flow from the tank $a$ to a tank containing the untreated syrup.

In effecting the continuous impregnation or saturation of sugar-juices by means of this apparatus the gas admitted through the orifice $h$ under low pressure carries the liquid from the tank $a$ with it into and up the pipe $e$, mixing and combining with it, while at the upper end of the pipe the impregnated or saturated liquid falls into the vessel $f$, the action being regulatable both as to chemical effect and yield, first, by the height of the liquid in the tank $a$; secondly, by regulating the valve-openings $p$ or the telescopic tube; thirdly, by the height of the siphon-tube $k$; and, fourthly, by the regulated return by means of the cock $o$ of the liquid already subjected to the action of the gas back to the tank $a$ in order to be again acted upon. The several pipes of the apparatus are made of sufficiently large diameter to allow of liquids being treated that contain more or less suspended matter.

Having thus described the nature of my said invention and the best means I know of carrying the same into practical effect, I claim—

1. An apparatus for saturating sugar-juices, comprising a tank for the juices to be treated, a vessel for the saturated juices, a pipe leading from the lower part of the tank to the receiving vessel, means for introducing a saturating-gas into the lower part of the pipe under sufficient pressure to raise the liquid from the tank to the vessel, whereby the liquid is saturated while being transferred by the gas from the tank to the vessel.

2. An apparatus for saturating sugar-juices, comprising a tank for the juices to be treated, an elevated vessel for the saturated juices, a pipe rising from near the bottom of the tank and extending into the receiving vessel above the level of the liquid therein, a tube surrounding that part of the pipe above the liquid in the receiving vessel and extending downward below the level of the liquid therein, and means for introducing a saturating-gas into the lower part of the pipe under sufficient pressure to raise the liquid from the tank through the pipe into the surrounding tube whence it falls into the receiving vessel.

3. An apparatus for saturating sugar-juices, comprising a tank for the juices to be treated, a superposed vessel for the saturated juices, a pipe rising from near the bottom of the tank and extending up through the receiving vessel, a tube surrounding the upper end of the pipe and extending down into the receiving vessel below the level of liquid therein, and means for introducing an impregnating-gas into the lower part of the pipe under sufficient pressure to raise the liquid from the tank through the pipe into the surrounding tube whence it falls into the receiving vessel.

4. An apparatus for saturating sugar juices, comprising a tank for the juices to be treated, a superposed vessel for the saturated juices, a pipe rising from near the bottom of the tank and extending up through the receiving vessel, a tube surrounding the upper end of the pipe and extending down into the receiving vessel below the level of liquid therein, means for introducing an impregnating-gas into the lower part of the pipe under sufficient pressure to raise the liquid from the tank through the pipe into the surrounding tube whence it falls into the receiving vessel, and means for discharging the saturated liquid at different elevations from the pipe into the surrounding tube.

5. An apparatus for saturating sugar-juices, comprising a tank for the juices to be treated, a superposed vessel for the saturated juices, a pipe rising from near the bottom of the tank and extending up through the receiving vessel, a tube surrounding the upper end of the pipe and extending down into the receiving vessel below the level of liquid therein, and means for introducing an impregnating-gas into the lower part of the pipe under sufficient pressure to raise the liquid from the tank through the pipe into the surrounding tube whence it falls into the receiving vessel, the upper end of the pipe being provided with telescopic sections for delivering the impregnated liquid into the surrounding tube at different elevations.

In testimony whereof I have affixed my signature in presence of two witnesses.

AUGUSTE PAGNIEZ.

Witnesses:
 ALBERT MAULVAULT,
 HANSON C. COXE.